US012675865B2

(12) United States Patent

Hall et al.

(10) Patent No.: US 12,675,865 B2

(45) Date of Patent: Jul. 7, 2026

(54) DETECTING BUBBLES IN IMAGES OF A SAMPLE IN WELLS OF A WELL PLATE

(71) Applicant: Wyatt Technology, LLC, Goleta, CA (US)

(72) Inventors: Brett Hall, Goleta, CA (US); Dwight Kahng, Camarillo, CA (US); Zixi Wang, Porter Ranch, CA (US)

(73) Assignee: Wyatt Technology, LLC, Goleta, CA (US)

( * ) Notice: Subject to any disclaimer, the term of this patent is extended or adjusted under 35 U.S.C. 154(b) by 229 days.

(21) Appl. No.: 18/201,756

(22) Filed: May 24, 2023

(65) Prior Publication Data

US 2023/0386010 A1 Nov. 30, 2023

Related U.S. Application Data

(60) Provisional application No. 63/345,423, filed on May 24, 2022.

(51) Int. Cl.
G06T 7/00 (2017.01)

(52) U.S. Cl.
CPC .. G06T 7/0004 (2013.01); G06T 2207/20084 (2013.01); G06T 2207/30072 (2013.01)

(58) Field of Classification Search
None
See application file for complete search history.

(56) References Cited

U.S. PATENT DOCUMENTS

| | | | | |
|---|---|---|---|---|
| 2018/0321137 A1* | 11/2018 | Ismagilov | ............ | G01N 21/253 |
| 2021/0090238 A1* | 3/2021 | Gallagher-Gruber | ........................ | |
| | | | | G01N 15/0625 |
| 2022/0012465 A1* | 1/2022 | Yuan | ...................... | G06V 10/82 |
| 2022/0215543 A1* | 7/2022 | Inoue | ..................... | G16H 30/40 |
| 2022/0344049 A1* | 10/2022 | Hall | ...................... | G06F 9/5066 |

OTHER PUBLICATIONS

International Search Report and Written Opinion in PCT/US2023/028756 mailed on Feb. 6, 2024.
Some, "DynaPro Plate Reader III Automated Dynamic and Static Light Scattering in Microwell Plates for Fast, Productive Development of Biologics", Dec. 20, 2022, https://web.archive.org/web/20221220230153if_/https://wyattfiles.s3-us-west-2.amazonaws.com/public-downloads/DynaProPlateReaderIII-whitepaper.pdf.

(Continued)

*Primary Examiner* — Leon Viet Q Nguyen
(74) *Attorney, Agent, or Firm* — Schmeiser Olsen, PLLC

(57) ABSTRACT

The present disclosure describes an apparatus, method, system, and computer program product of detecting bubbles in images of a sample in wells of a well plate. In an exemplary embodiment, In an exemplary embodiment, the computer implemented method, the system, and the computer program product include receiving, by a computer system, at least one image of at least one well of a well plate containing a liquid sample, executing, by the computer system, a set of logical operations cropping the image to include a well of interest, and executing, by the computer system, a set of logical operations processing, by a trained convolutional neural network, the cropped image, resulting in a probability that the image depicts at least one bubble.

15 Claims, 6 Drawing Sheets

(56) References Cited

OTHER PUBLICATIONS

Anonymous, "How Can I Use the Bubble Detection Feature in DYNAMICS to Quickly Screen DynaPro Plate Reader Data?", May 7, 2023, Santa Barbara, USA, https://web.archive.org/web/20230507041250/https://www.wyatt.com/ask-the-expert/how-can-i-use-the-bubble-detection-feature-in-dynamics-to-quickly-screen-dynapro-plate-reader-data.html.

Bhuiyan, et al., "Artificial Intelligence-Controlled Microfluidic Device for Fluid Automation and Bubble Removal of Immunoassay Operated by a Smartphone", Analytical Chemistry, Feb. 18, 2022, vol. 94, No. 9, pp. 3872-3880, https://doi.org/10.1021/acs.analchem.1c04827.

Hessenkemper, et al., "Bubble Identification from Images with Machine Learning Methods", arxiv.org, Feb. 7, 2022, https://arXiv.2202.03107.

* cited by examiner

Plate Reader camera can help interpret the ACF

Bubbles and particles in nano-dispersion cause non-ideal shape (particle number fluctuations) and inconsistent results Smaller particles or absence of particles interfere less

DETECTING BUBBLES IN IMAGES OF A SAMPLE IN WELLS OF A WELL PLATE

PRIORITY

This application claims priority to U.S. Provisional Patent Application No. 63/345,423, filed May 24, 2022.

BACKGROUND

The present disclosure relates to samples, and more specifically, to detecting bubbles in images of a sample in wells of a well plate.

SUMMARY

The present disclosure describes a computer implemented method, a system, and a computer program product of detecting bubbles in images of a sample in wells of a well plate. In an exemplary embodiment, the computer implemented method, the system, and the computer program product include (1) receiving, by a computer system, at least one image of at least one well of a well plate containing a liquid sample, (2) executing, by the computer system, a set of logical operations cropping the image to include a well of interest, and (3) executing, by the computer system, a set of logical operations processing, by a trained convolutional neural network (CNN), the cropped image, resulting in a probability that the image depicts at least one bubble. In an embodiment, the CNN includes a CNN trained by a Stochastic Gradient Descent training session on a set of training images of the at least one well. For example, the CNN is a CNN trained by a Stochastic Gradient Descent training session on a set of training images of the at least one well.

In an exemplary embodiment, the computer implemented method, the system, and the computer program product include (1) receiving, by a computer system, parameters for a Stochastic Gradient Descent (SGD) training session, (2) receiving, by a computer system, a set of training images of at least one well of a well plate containing a liquid sample from a data store (e.g., file system, database), (3) processing, by the computer system, the set of training images with respect to the parameters to select random images among the training images, resulting in at least one mini-batch comprising mini-batch images, (4) processing, by the computer system, the at least one mini-batch via a convolutional neural network (CNN) comprising a set of weights and biases, resulting in a probability value for each of the mini-batch images in the at least one mini-batch that the each of the mini-batch images depicts at least one bubble, resulting in a set of mini-batch probability values corresponding to the at least one mini-batch, (5) calculating, by the computer system, a gradient of a loss function with respect to the set of weights and biases of the CNN evaluated for the set of mini-batch probability value, (6) processing, by the computer system, the CNN with respect to the calculated gradient, resulting in an updated CNN with an updated set of weights and biases, (7) processing, by the computer system, the at least one mini-batch with the updated CNN with respect to the parameters in an iterative fashion in an epoch corresponding to the mini-batch, and (8) outputting, by the computer system, a trained CNN with respect to the training parameters and the set of training images. In an embodiment, the set of training images includes approximately 700 images.

DETAILED DESCRIPTION

Figure 1:
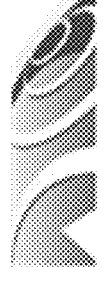
FIG. 1 depicts prior art images.
Figure 1:
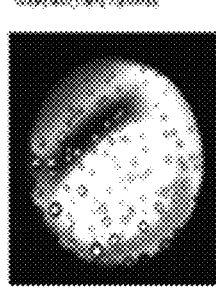
Figure 1:
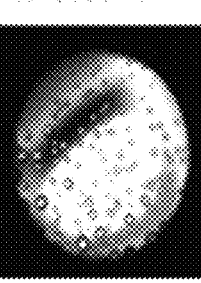
Figure 1:
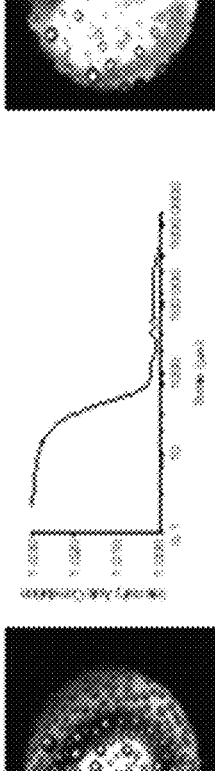
Figure 1:
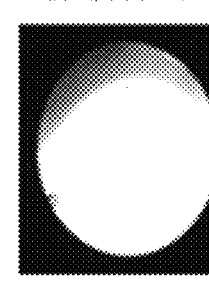
Figure 1:
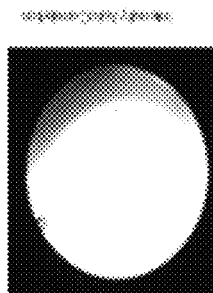
Figure 1:
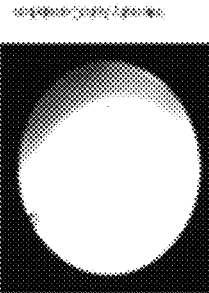
Figure 1:
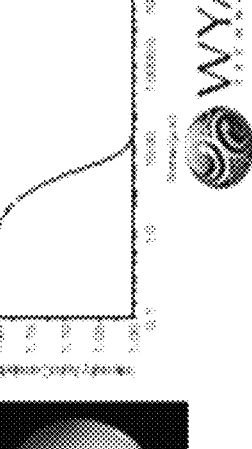

The present disclosure describes a computer implemented method, a system, and a computer program product of detecting bubbles in images of a sample in wells of a well plate. In an exemplary embodiment, the computer implemented method, the system, and the computer program product include (1) receiving, by a computer system, at least one image of at least one well of a well plate containing a liquid sample, (2) executing, by the computer system, a set of logical operations cropping the image to include a well of interest, and (3) executing, by the computer system, a set of logical operations processing, by a trained convolutional neural network, the cropped image, resulting in a probability that the image depicts at least one bubble. In an embodiment, the convolutional neural network includes a convolutional neural network trained by a stochastic gradient descent training session on a set of training images of the at least one well. For example, the convolutional neural network is a convolutional neural network trained by a stochastic gradient descent training session on a set of training images of the at least one well.

Definitions

Particle

A particle may be a constituent of a liquid sample aliquot. Such particles may be molecules of varying types and sizes, nanoparticles, virus like particles, liposomes, emulsions, bacteria, and colloids. These particles may range in size on the order of nanometer to microns.

Analysis of Macromolecular or Particle Species in Solution

The analysis of macromolecular or particle species in solution may be achieved by preparing a sample in an appropriate solvent and then injecting an aliquot thereof into a separation system such as a liquid chromatography (LC) column or field flow fractionation (FFF) channel where the different species of particles contained within the sample are separated into their various constituencies. Once separated, generally based on size, mass, or column affinity, the samples may be subjected to analysis by means of light scattering, refractive index, ultraviolet absorption, electrophoretic mobility, and viscometric response.

Light Scattering

Light scattering (LS) is a non-invasive technique for characterizing macromolecules and a wide range of particles in solution. The two types of light scattering detection frequently used for the characterization of macromolecules are static light scattering and dynamic light scattering.

Dynamic Light Scattering

Dynamic light scattering is also known as quasi-elastic light scattering (QELS) and photon correlation spectroscopy (PCS). In a DLS experiment, time-dependent fluctuations in the scattered light signal are measured using a fast photo-detector. DLS measurements determine the diffusion coefficient of the molecules or particles, which can in turn be used to calculate their hydrodynamic radius.

Static Light Scattering

Static light scattering (SLS) includes a variety of techniques, such as single angle light scattering (SALS), dual angle light scattering (DALS), low angle light scattering (LALS), and multi-angle light scattering (MALS). SLS experiments generally involve the measurement of the absolute intensity of the light scattered from a sample in solution that is illuminated by a fine beam of light. Such measurement is often used, for appropriate classes of particles/molecules, to determine the size and structure of the sample molecules or particles, and, when combined with knowledge of the sample concentration, the determination of weight average molar mass. In addition, nonlinearity of the intensity of scattered light as a function of sample concentration may be used to measure interparticle interactions and associations.

Multi-Angle Light Scattering

Multi-angle light scattering (MALS) is a SLS technique for measuring the light scattered by a sample into a plurality of angles. It is used for determining both the absolute molar mass and the average size of molecules in solution, by detecting how they scatter light. Collimated light from a laser source is most often used, in which case the technique can be referred to as multiangle laser light scattering (MALLS). The "multi-angle" term refers to the detection of scattered light at different discrete angles as measured, for example, by a single detector moved over a range that includes the particular angles selected or an array of detectors fixed at specific angular locations.

A MALS measurement requires a set of ancillary elements. Most important among them is a collimated or focused light beam (usually from a laser source producing a collimated beam of monochromatic light) that illuminates a region of the sample. The beam is generally plane-polarized perpendicular to the plane of measurement, though other polarizations may be used especially when studying anisotropic particles. Another required element is an optical cell to hold the sample being measured. Alternatively, cells incorporating means to permit measurement of flowing samples may be employed. If single-particles scattering properties are to be measured, a means to introduce such particles one-at-a-time through the light beam at a point generally equidistant from the surrounding detectors must be provided.

Although most MALS-based measurements are performed in a plane containing a set of detectors usually equidistantly placed from a centrally located sample through which the illuminating beam passes, three-dimensional versions also have been developed where the detectors lie on the surface of a sphere with the sample controlled to pass through its center where it intersects the path of the incident light beam passing along a diameter of the sphere. The MALS technique generally collects multiplexed data sequentially from the outputs of a set of discrete detectors. The MALS light scattering photometer generally has a plurality of detectors.

Normalizing the signals captured by the photodetectors of a MALS detector at each angle may be necessary because different detectors in the MALS detector (i) may have slightly different quantum efficiencies and different gains, and (ii) may look at different geometrical scattering volumes. Without normalizing for these differences, the MALS detector results could be nonsensical and improperly weighted toward different detector angles.

Machine Learning

Machine learning (ML) is an important component of the growing field of data science. Through the use of statistical methods, algorithms are trained to make classifications or predictions, and to uncover key insights in data mining projects. These insights subsequently drive decision making within applications and businesses, ideally impacting key growth metrics. Machine learning algorithms are typically created using frameworks that accelerate solution development, such as TensorFlow and PyTorch.

"Deep" machine learning can use labeled datasets, also known as supervised learning, to inform its algorithm, but it doesn't necessarily require a labeled dataset. Deep learning can ingest unstructured data in its raw form (e.g., text or images), and it can automatically determine the set of features which distinguish different categories of data from one another. This eliminates some of the human intervention required and enables the use of larger data sets. Deep learning could be considered "scalable machine learning".

Classical, or "non-deep", machine learning is more dependent on human intervention to learn. Human experts determine the set of features to understand the differences between data inputs, usually requiring more structured data to learn.

Neural Networks

Neural networks, or artificial neural networks (ANNs), are comprised of node layers, containing an input layer, one or more hidden layers, and an output layer. Each node, or artificial neuron, connects to another and has an associated weight and threshold. If the output of any individual node is above the specified threshold value, that node is activated, sending data to the next layer of the network. Otherwise, no data is passed along to the next layer of the network by that node.

The "deep" in deep learning is just referring to the number of layers in a neural network. A neural network that consists of more than three layers—which would be inclusive of the input and the output—can be considered a deep learning algorithm or a deep neural network. A neural network that only has three layers is just a basic neural network. Deep learning and neural networks are credited with accelerating progress in areas such as computer vision, natural language processing, and speech recognition.

Neural networks simulate the way the human brain works, with a huge number of linked processing nodes. Neural networks are good at recognizing patterns and play an important role in applications including natural language translation, image recognition, speech recognition, and image creation.

Convolutional Neural Network

A convolutional neural network (CNN/ConvNet) is a class of neural networks that specializes in processing data that has a grid-like topology, such as an image. A digital image is a binary representation of visual data. It contains a series of pixels arranged in a grid-like fashion that contains pixel values to denote how bright and what color each pixel should be.

The human brain processes a huge amount of information the second we see an image. Each neuron works in its own receptive field and is connected to other neurons in a way that they cover the entire visual field. Just as each neuron responds to stimuli only in the restricted region of the visual field called the receptive field in the biological vision system, each neuron in a CNN processes data only in its receptive field as well. The layers are arranged in such a way so that they detect simpler patterns first (lines, curves, etc.) and more complex patterns (faces, objects, etc.) further along. By using a CNN, one can enable sight to computers.

A CNN typically has three layers: a convolutional layer, a pooling layer, and a fully connected layer. The convolution layer is the core building block of the CNN. It carries the main portion of the network's computational load. This layer performs a dot product between two matrices, where one matrix is the set of learnable parameters otherwise known as a kernel, and the other matrix is the restricted portion of the receptive field. The kernel is spatially smaller than an image but is more in-depth. This means that, if the image is composed of three (RGB) channels, the kernel height and width will be spatially small, but the depth extends up to all three channels.

During the forward pass, the kernel slides across the height and width of the image-producing the image representation of that receptive region. This produces a two-dimensional representation of the image known as an activation map that gives the response of the kernel at each spatial position of the image. The sliding size of the kernel is called a stride.

If we have an input of size W×W×D and Dout number of kernels with a spatial size of F with stride S and amount of padding P, then the size of output volume can be determined by the following formula:

$$W_{out} = ((W-F+2P)/S)+1,$$

yielding an output volume of Wout×Wout×Dout.

The pooling layer replaces the output of the network at certain locations by deriving a summary statistic of the nearby outputs. This helps in reducing the spatial size of the representation, which decreases the required amount of computation and weights. The pooling operation is processed on every slice of the representation individually.

There are several pooling functions such as the average of the rectangular neighborhood, L2 norm of the rectangular neighborhood, and a weighted average based on the distance from the central pixel. However, the most popular process is max pooling, which reports the maximum output from the neighborhood.

If we have an activation map of size W×W×D, a pooling kernel of spatial size F, and stride S, then the size of output volume can be determined by the following formula:

$$W_{out} = ((W-F)/S)+1.$$

yielding an output volume of Wout×Wout×D. In all cases, pooling provides some translation invariance which means that an object would be recognizable regardless of where it appears on the frame.

The fully connected (FC) layer contains neurons that have full connectivity with all neurons in the preceding and succeeding layer as seen in regular FCNN. This is why it can be computed as usual by a matrix multiplication followed by a bias effect. The FC layer helps to map the representation between the input and the output.

Learning System

The learning system of a machine learning algorithm into three main parts. The first part is a decision process part. In the decision part, machine learning algorithms are used to make a prediction or classification. Based on some input data, which can be labeled or unlabeled, the algorithm will produce an estimate about a pattern in the data.

The second part is an error function part. An error function evaluates the prediction of the model. If there are known examples, an error function can make a comparison to assess the accuracy of the model.

The third part is a model optimization process. If the model can fit better to the data points in the training set, then weights are adjusted to reduce the discrepancy between the known example and the model estimate. The algorithm will repeat this "evaluate and optimize" process, updating weights autonomously until a threshold of accuracy has been met.

Learning Methods

Machine learning models fall into three primary categories. The first category is supervised machine learning. Supervised learning, also known as supervised machine learning, is defined by its use of labeled datasets to train algorithms to classify data or predict outcomes accurately. As input data is fed into the model, the model adjusts its weights until it has been fitted appropriately. This occurs as part of the cross validation process to ensure that the model avoids overfitting or underfitting. Supervised learning helps organizations solve a variety of real-world problems at scale, such as classifying spam in a separate folder from your inbox. Some methods used in supervised learning include neural networks, naïve bayes, linear regression, logistic regression, random forest, and support vector machine (SVM).

The second category is unsupervised machine learning. Unsupervised learning, also known as unsupervised machine learning, uses machine learning algorithms to analyze and cluster unlabeled datasets. These algorithms discover hidden patterns or data groupings without the need for human intervention. This method's ability to discover similarities and differences in information make it ideal for exploratory data analysis, cross-selling strategies, customer segmentation, and image and pattern recognition. It's also used to reduce the number of features in a model through the process of dimensionality reduction. Principal component analysis (PCA) and singular value decomposition (SVD) are two common approaches for this. Other algorithms used in unsupervised learning include neural networks, k-means clustering, and probabilistic clustering methods.

The third category is semi-supervised learning. Semi-supervised learning offers a happy medium between supervised and unsupervised learning. During training, it uses a smaller labeled data set to guide classification and feature extraction from a larger, unlabeled data set. Semi-supervised learning can solve the problem of not having enough labeled data for a supervised learning algorithm. It also helps if it's too costly to label enough data.

Backpropagation

In machine learning, backpropagation is a widely used algorithm for training feedforward artificial neural networks or other parameterized networks with differentiable nodes It is an efficient application of the Leibniz chain rule to such networks. It is also known as the reverse mode of automatic differentiation or reverse accumulation. Backpropagation computes the gradient of a loss function with respect to the weights of the network for a single input-output example, and does so efficiently, computing the gradient one layer at a time, iterating backward from the last layer to avoid redundant calculations of intermediate terms in the chain rule; this can be derived through dynamic programming. Gradient descent, or variants such as stochastic gradient descent, are commonly used. data.

Cross Entropy

The cross-entropy between two probability distributions p p and q q over the same underlying set of events measures the average number of bits needed to identify an event drawn from the set if a coding scheme used for the set is optimized for an estimated probability distribution q q, rather than the true distribution p p.

Cross-entropy can be used to define a loss function in machine learning and optimization. The true probability p i $p\_\{i\}$ is the true label, and the given distribution q i $q\_\{i\}$ is the predicted value of the current model. This is also known as the log loss (or logarithmic loss or logistic loss).

Stochastic Gradient Descent

Stochastic gradient descent (often abbreviated SGD) is an iterative method for optimizing an objective function with suitable smoothness properties (e.g. differentiable or subdifferentiable). It can be regarded as a stochastic approximation of gradient descent optimization, since it replaces the actual gradient (calculated from the entire data set) by an estimate thereof (calculated from a randomly selected subset of the data). Especially in high-dimensional optimization problems this reduces the very high computational burden, achieving faster iterations in exchange for a lower convergence rate.

Adam Algorithm

The choice of optimization algorithm for a deep learning model can mean the difference between good results in minutes, hours, and days. The Adam optimization algorithm is an extension to stochastic gradient descent that has seen broader adoption for deep learning applications in computer vision and natural language processing. Adam is an optimization algorithm that can be used instead of the classical stochastic gradient descent procedure to update network weights iterative based in training data.

Instead of adapting the parameter learning rates based on the average first moment (the mean) as in RMSProp, Adam also makes use of the average of the second moments of the gradients (the uncentered variance). Specifically, the algorithm calculates an exponential moving average of the gradient and the squared gradient, and the parameters beta1 and beta2 control the decay rates of these moving averages. The initial value of the moving averages and beta1 and beta2 values close to 1.0 (recommended) result in a bias of moment estimates towards zero. This bias is overcome by first calculating the biased estimates before then calculating bias-corrected estimates.

Autocorrelation

Autocorrelation is the correlation of a signal with a delayed copy of itself as a function of delay. Informally, it is the similarity between observations of a random variable as a function of the time lag between them. The analysis of autocorrelation is a mathematical tool for finding repeating patterns, such as the presence of a periodic signal obscured by noise, or identifying the missing fundamental frequency in a signal implied by its harmonic frequencies. It is often used in signal processing for analyzing functions or series of values, such as time domain signals. Unit root processes, trend-stationary processes, autoregressive processes, and moving average processes are specific forms of processes with autocorrelation.

Loss Function

A loss function (cost function/error function) is a function that maps an event or values of one or more variables onto a real number intuitively representing some "cost" associated with the event. An optimization problem seeks to minimize a loss function. An objective function is either a loss function or its opposite (in specific domains, variously called a reward function, a profit function, a utility function, a fitness function, etc.), in which case it is to be maximized. The loss function could include terms from several levels of the hierarchy. In statistics, typically a loss function is used for parameter estimation, and the event in question is some function of the difference between estimated and true values for an instance of data.

Current Technologies

Current technologies allow for making both static light scattering (SLS) and dynamic light scattering (DLS) measurements in flowing and batch (non-flowing) systems. Many commercially available instruments allow for the measurement of SLS and/or DLS, and there are many methods to perform these measurements. With the development and improvement in the optical quality of multiwell plates, it has become possible to make both SLS and DLS, as well as other measurements of the physical properties, such as fluorescence, concentration, and absorption, directly from samples contained therein.

Methods capable of measuring samples directly in these multiwell plates are generally desirable given both the high-throughput nature of the measurements and the reduced sample volume requirements. Multiwell plates may contain any number of independent wells. Most commercially available plates for analyses such as these contain either 96, 384, or 1536, each well is able to contain a different sample, and all wells may be tested in a single data collection run. In addition, use of these plates obviates the laborious need to clean and dry individual scintillation vials after each measurement.

These plates generally have very low volume wells, and commercially available multiwell plate-based measurement instruments are capable of light scattering measurements from sample volumes of 4 μL or less. These tiny sample volumes are of great benefit when one has a limited amount of sample from which to make measurements, particularly when compared to the 300 μL or larger sized measurement volumes often required by other light scattering techniques.

All light scattering measurements are subject to various sources of unwanted noise, which can lead to inaccurate measurements of the light scattering properties of the sample itself. This noise may be due to unknown contaminants present in the sample, soiled or improperly manufactured or maintained or dirty surfaces of the vessel through which the light transmitted and/or measured passes. Imperfections in the surfaces of the vessel or other contaminants contained therein or adhered thereto, such as bubbles, precipitated particles, residue, etc., may also cause background scattering which can also interfere with proper measurements of scattered light from the sample or may interfere with the beam or scattered light expected to exit the vessel and be measured by a detector. In other words, deleterious high background signal, or noise, is caused by light scattered from anything other than the sample, as depicted in FIG. 1.

This background noise decreases the light scattering instrument's sensitivity due to the increase in the noise present in relation to the useful signal scattered from the sample itself, and therefore an overall reduction in the signal-to-noise ratio upon which the sensitivity of the measurement is dependent. For DLS measurements, higher sample concentrations of precious sample materials are required to overcome this background signal. The signals captured by the photodetectors of a MALS detector at each angle may be necessary because different detectors in the MALS detector (i) may have slightly different quantum efficiencies and different gains, and (ii) may look at different geometrical scattering volumes. Without normalizing for these differences, the MALS detector results could be nonsensical and improperly weighted toward different detector angles.

While light scattering detection in multiwell plates has many advantages, including high throughput measurements, the ability to control the temperature of multiple samples simultaneously, and the ability to monitor aggregation and other self and hetero associations, to name only a few, there are special pitfalls associated with these measurements. For example, gas bubbles may adhere to the bottom or side of the well, or may float within the sample itself or at or near the fluid meniscus. In addition, multiwell plates may be reused, and thus careful cleaning is required between sample collections, where imperfect washing may leave behind artifacts or residues that can deleteriously affect light scattering measurements.

The amount of time required of an operator or a robotic injector to fill an entire plate opens up the possibility for dust particles to fall into the wells or other contaminants to be introduced thereto by the handling of the plates while loading wells, such as oil from skin, powder from handling gloves, cosmetics, flaking skin cells, debris from loading pipettes.

Current Technologies

Current technologies, as depicted in prior art FIG. 1A and FIG. 1B allow for installing a cuvette in a receptacle in the instrument as shown in FIG. 1A, where the cuvette and the sample are exposed to (a) low power laser light that allow for various properties of the sample to be inferred based on scattered light measured by several detectors placed around the cuvette receptacle, and (b) a wide temperature range—(−10 C to 120 C). Since samples to be inserted into the cuvette could be prepared in corrosive solvents such as salt water, toluene, etc., current technologies allow for a reasonable probability of spills occurring in the receptacle. Current technologies could lead to inaccurate measurement of sample properties because of a need for good positioning accuracy of the cuvette (~10 microns) in the receptacle. Thus, there is a need to identify a cuvette for measuring light scattering of a sample, in a way that satisfies the following constraints: (1) withstands the full temperature range (−10 to 120 C), (2) able to survive an accidental condensation event (in the event of the user supplying non-conforming 'dry' gas during cooling), (3) not interfere with cuvette positioning, (4) not interfere with light scattering measurement (not generate stray light during measurement), (5) withstands accidental spills of potentially corrosive solvents, (6) has high reliability as the temperature limit failsafe is dependent on correct detection of the cuvette type (plastic disposable cuvette has a lower high temperature limit), (7) low cost, (8) manufacturable, and (9) serviceable.

There is a need to detectg bubbles in images of a sample in wells of a well plate.

Figure 2:
FIG. 2 depicts a flowchart in accordance with an exemplary embodiment.
Figure 2:
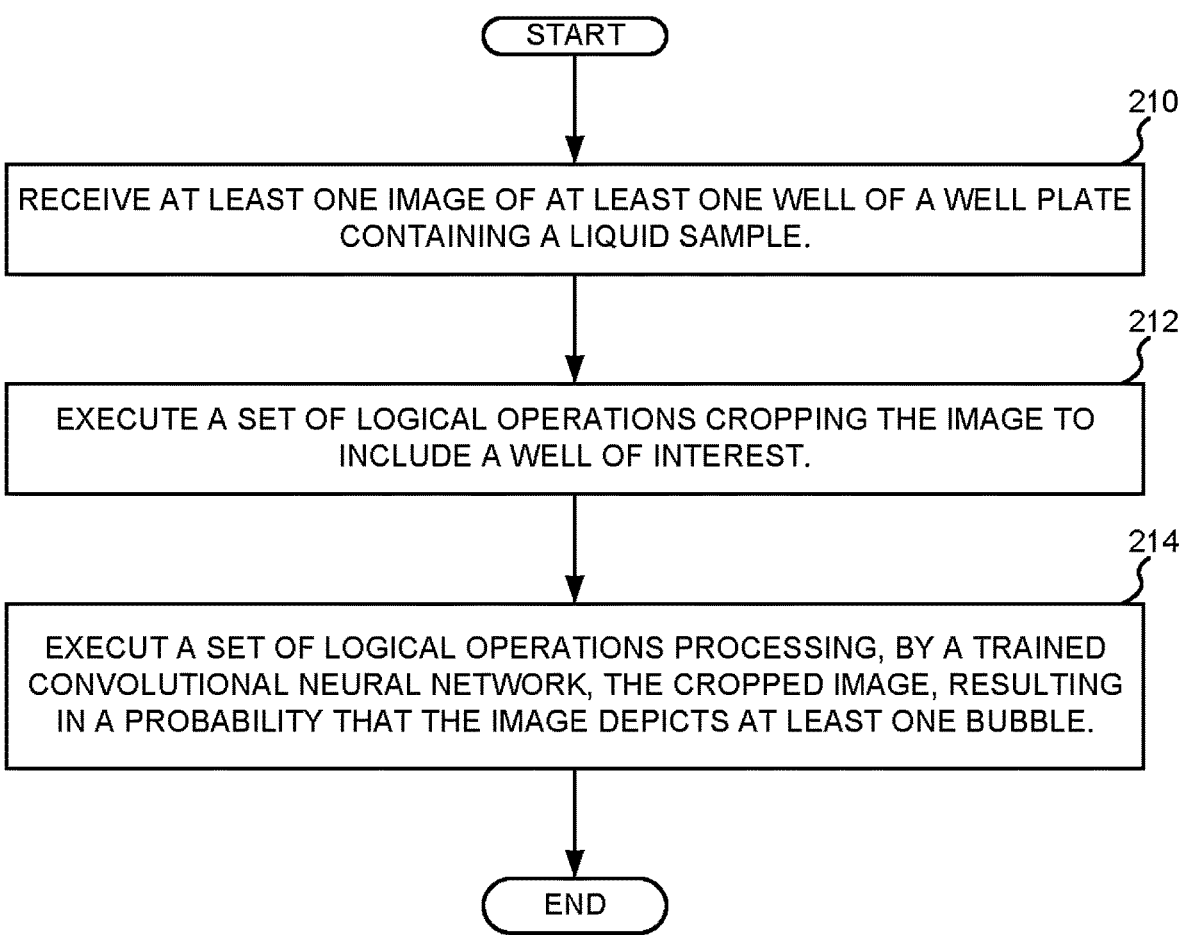

Referring to FIG. 2A, in an exemplary embodiment, the computer implemented method, the system, and the computer program product are configured to perform an operation 210 of receiving, by a computer system, at least one image of at least one well of a well plate containing a liquid sample, an operation 212 of executing, by the computer system, a set of logical operations cropping the image to include a well of interest, and an operation 214 of executing, by the computer system, a set of logical operations processing, by a trained convolutional neural network, the cropped image, resulting in a probability that the image depicts at least one bubble.

In an exemplary embodiment, the computer implemented method, the system, and the computer program product include (1) receiving, by a computer system, parameters for a stochastic gradient descent (SGD) training session, (2) receiving, by a computer system, a set of training images of at least one well of a well plate containing a liquid sample from a data store (e.g., file system, database), (3) processing, by the computer system, the set of training images with respect to the parameters to select random images among the training images, resulting in at least one mini-batch comprising mini-batch images, (4) processing, by the computer system, the at least one mini-batch via a convolutional neural network (CNN) comprising a set of weights and biases, resulting in a probability value for each of the mini-batch images in the at least one mini-batch that the each of the mini-batch images depicts at least one bubble, resulting in a set of mini-batch probability values corresponding to the at least one mini-batch, (5) calculating, by the computer system, a gradient of a loss function with respect to the set of weights and biases of the CNN evaluated for the set of mini-batch probability value, (6) processing, by the computer system, the CNN with respect to the calculated gradient, resulting in an updated CNN with an updated set of weights and biases, (7) processing, by the computer system, the at least one mini-batch with the updated CNN with respect to the parameters in an iterative fashion in an epoch corresponding to the mini-batch, and (8) outputting, by the computer system, a trained CNN with respect to the training parameters and the set of training images. In an embodiment, the set of training images includes approximately 700 images.

Figure 5:
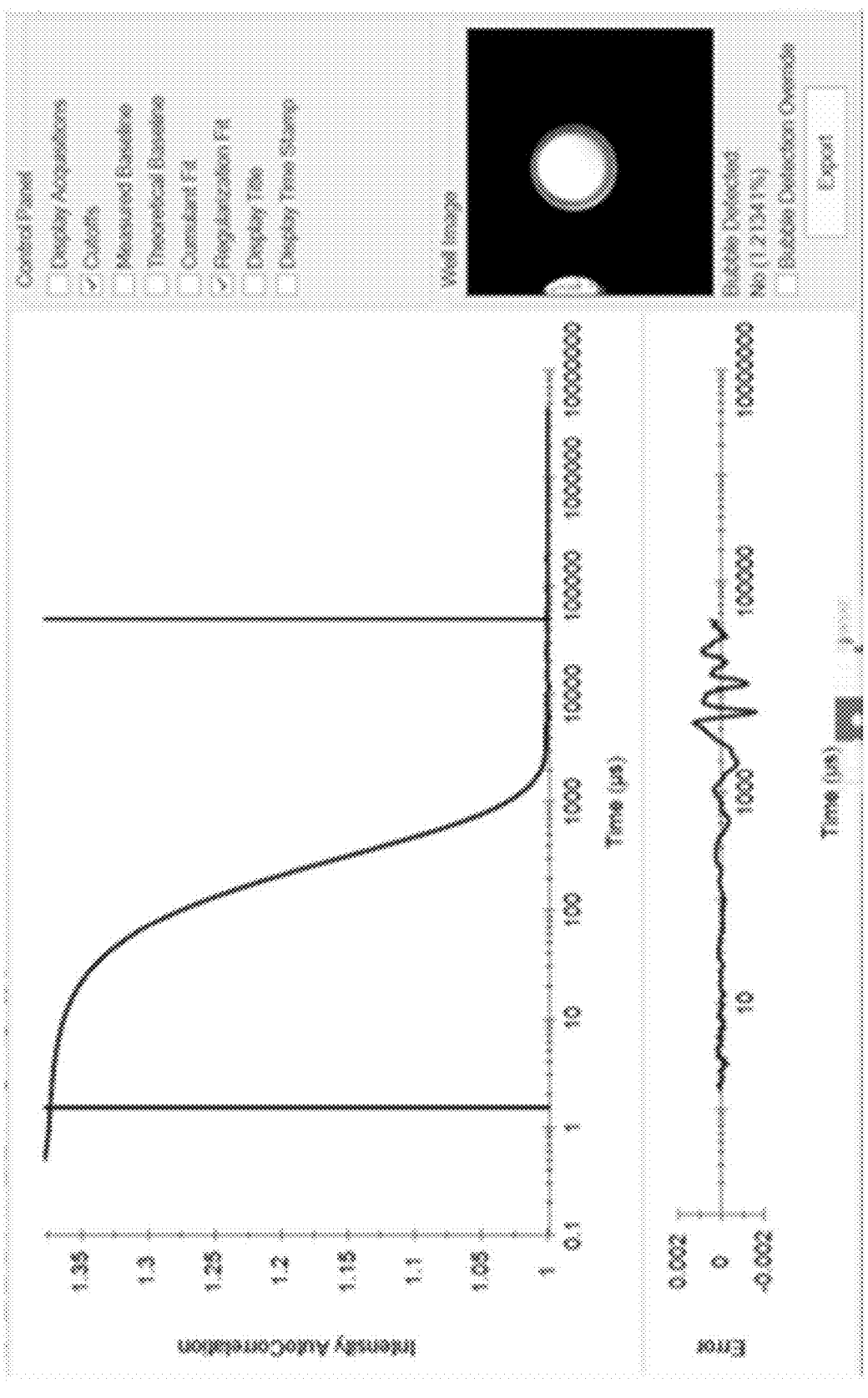
FIG. 5 depicts a display in accordance with an embodiment.

In an exemplary embodiment, the computer system is a standalone computer system, such as computer system 500 shown in FIG. 5, a network of distributed computers, where at least some of the computers are computer systems such as computer system 500 shown in FIG. 5, or a cloud computing node server, such as computer system 500 shown in FIG. 5. In an embodiment, the computer system is a computer system 500 as shown in FIG. 5, that executes a detecting bubbles in images of a sample in wells of a well plate script or computer software application that carries out the operations of at least the method. In an embodiment, the computer system is a computer system/server 512 as shown in FIG. 5, that executes a detecting bubbles in images of a sample in wells of a well plate script or computer software application that carries out the operations of at least the method. In an embodiment, the computer system is a processing unit 516 as shown in FIG. 5, that executes a detecting bubbles in images of a sample in wells of a well plate script or computer software application that carries out the operations of at least the method. In an embodiment, the computer system is a machine learning computer software/program/algorithm that executes a detecting bubbles in images of a sample in wells of a well plate script or computer software application that carries out the operations of at least the method.

Displaying Presence of Bubble

Figure 3:
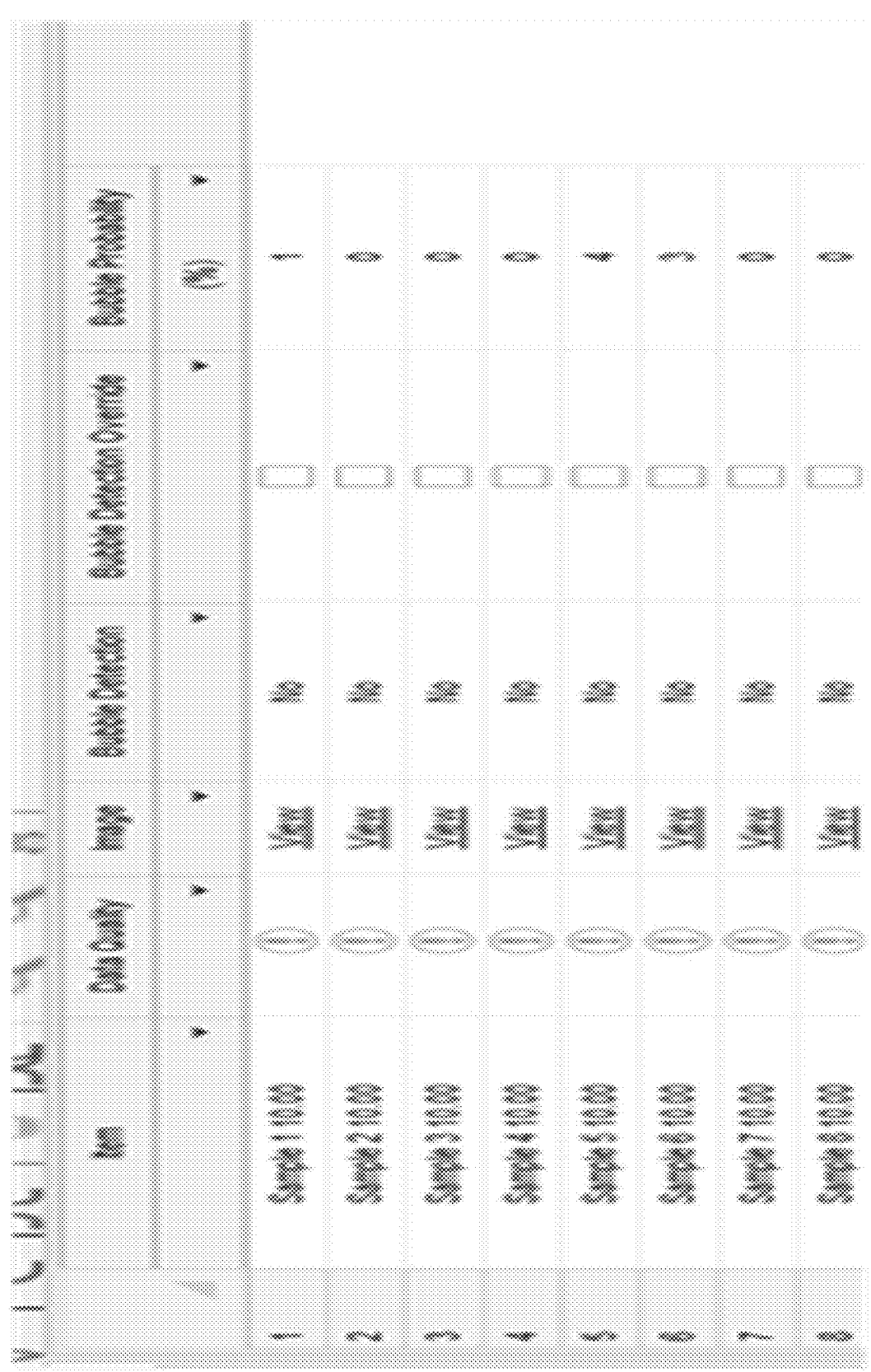
FIG. 3 depicts a display in accordance with an embodiment.

In a further embodiment, the computer implemented method, the system, and the computer program product further include displaying, by the computer system, on a display of the computer system a presence of the at least one bubble in the sample. In an embodiment, as depicted in FIG. 3, the displaying includes displaying, by the computer system, on the display of the computer system a presence of the at least one bubble in the sample in a data grid format displaying data corresponding to the sample, where the data includes a sample identifier corresponding to the sample, a data quality indicator to indicate a problem with the sample, and a bubble detection indicator to indicate the presence of the at least one bubble. In a further embodiment, the data further includes the probability corresponding to the sample.

Figure 4:
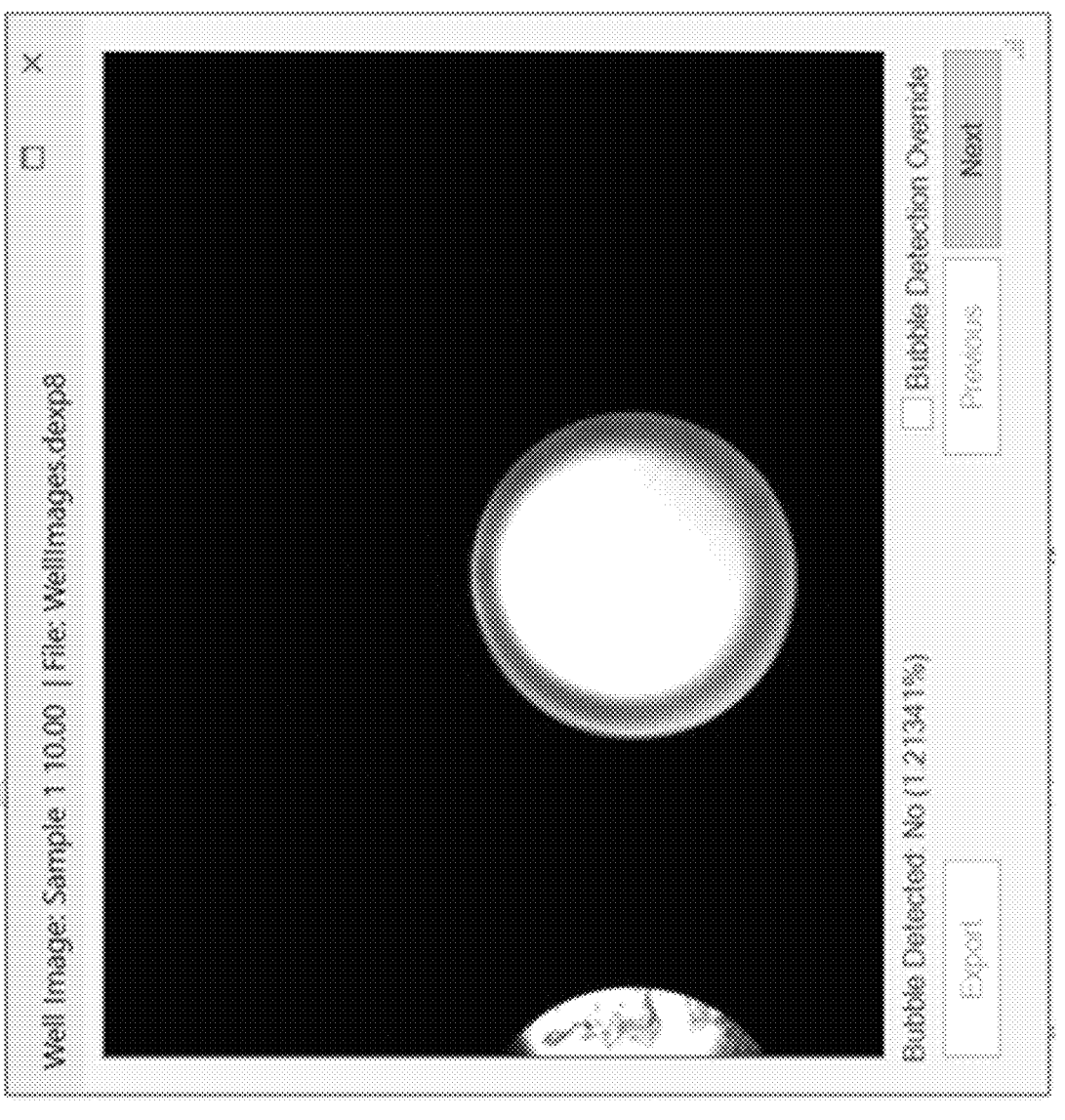
FIG. 4 depicts a display in accordance with an embodiment.

In an embodiment, as depicted in FIG. 4, the displaying includes displaying, by the computer system, on the display of the computer system a presence of the at least one bubble in the sample in an image view format displaying the image. In a further embodiment, the displaying further includes displaying, by the computer system, on the display of the computer system, the probability.

In an embodiment, as depicted in FIG. 5, the displaying includes displaying, by the computer system, on the display of the computer system a presence of the at least one bubble in the sample in an autocorrelation format displaying an intensity autocorrelation graph, an error graph. In a further embodiment, the displaying further rther includes displaying, by the computer system, on the display of the computer system, the probability.

For example, the autocorrelation graph depicts the integration of an intensity signal corresponding to pixels in the at least one image with a time-delayed version of the intensity signal, where the integrated signal decays according to the bouncing around of particles in the sample, where the longer the decay, the bigger the particles in the sample, and where the bouncing around of the error graph indicates the presence of the at least one bubble.

Parameters

In an embodiment, the parameters include (a) a mini-batch size of each mini-batch indicating a number of images in the mini-batch (e.g., size of mini batch=128 images initially, 128 images now), (b) a number of epochs within which the CNN is trained on each mini-batch (e.g., 5 epochs initially, 20 epochs now), (c) an input image size (e.g., 64×64 pixels initially, 112×112 pixels now) (balance cost of processing, memory v. performance), (d) a number of iterations in an epoch corresponding to a number of training images divided by the mini-batch size (e.g., 700/128).

Loss Function

In an embodiment, the loss function includes a cross-entropy loss function.

Learning Rate

In a further embodiment, the computer implemented method, the system, and the computer program product further include processing, by the computer system, a learning rate of the SGD training session via an ADAM algorithm with respect to changes in the loss function among iterations of the SGD training sessions, where the learning rate is configured to control how fast the gradient is descended (rolling downhill).

Computer System

Figure 6:
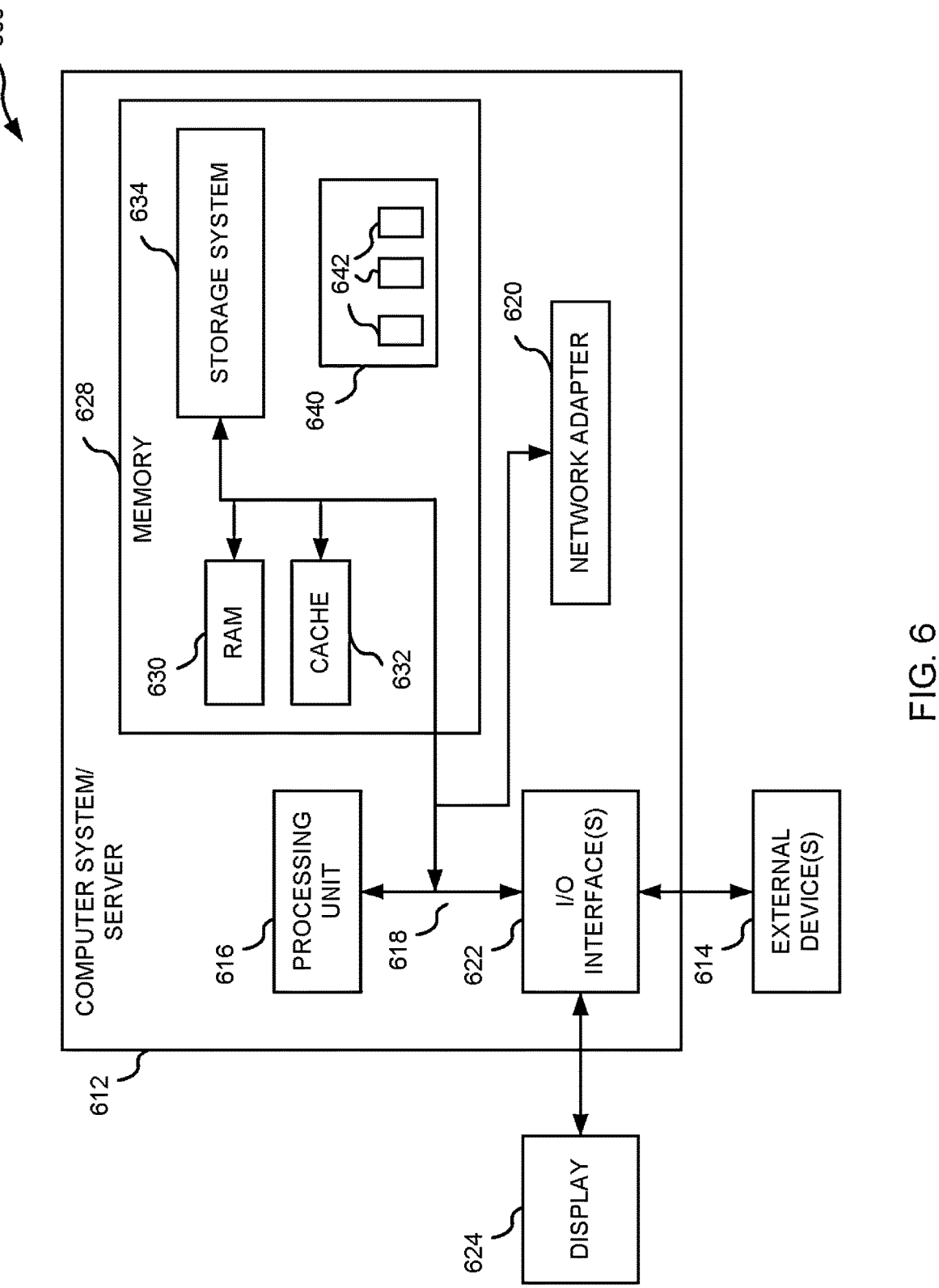
FIG. 6 depicts a computer system in accordance with an exemplary embodiment.

In an exemplary embodiment, the computer system is a computer system 600 as shown in FIG. 6. Computer system 600 is only one example of a computer system and is not intended to suggest any limitation as to the scope of use or functionality of embodiments of the present invention. Regardless, computer system 600 is capable of being implemented to perform and/or performing any of the functionality/operations of the present invention.

Computer system 600 includes a computer system/server 612, which is operational with numerous other general purpose or special purpose computing system environments or configurations. Examples of well-known computing systems, environments, and/or configurations that may be suitable for use with computer system/server 612 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer system/server 612 may be described in the general context of computer system-executable instructions, such as program modules, being executed by a computer system. Generally, program modules may include routines, programs, objects, components, logic, and/or data structures that perform particular tasks or implement particular abstract data types. Computer system/server 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 612 in computer system 600 is shown in the form of a general-purpose computing device. The components of computer system/server 612 may include, but are not limited to, one or more processors or processing units 616, a system memory 628, and a bus 618 that couples various system components including system memory 628 to processor 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 612 typically includes a variety of computer system readable media. Such media may be any available media that is accessible by computer system/server 612, and includes both volatile and non-volatile media, removable and non-removable media.

System memory 628 can include computer system readable media in the form of volatile memory, such as random access memory (RAM) 630 and/or cache memory 632. Computer system/server 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions/operations of embodiments of the invention.

Program/utility 640, having a set (at least one) of program modules 642, may be stored in memory 628 by way of example, and not limitation. Exemplary program modules 642 may include an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the present invention.

Computer system/server 612 may also communicate with one or more external devices 614 such as a keyboard, a pointing device, a display 624, one or more devices that enable a user to interact with computer system/server 612, and/or any devices (e.g., network card, modem, etc.) that enable computer system/server 612 to communicate with one or more other computing devices. Such communication can occur via Input/Output (I/O) interfaces 622. Still yet, computer system/server 612 can communicate with one or more networks such as a local area network (LAN), a general wide area network (WAN), and/or a public network (e.g., the Internet) via network adapter 620. As depicted, network adapter 620 communicates with the other components of computer system/server 612 via bus 618. It should be understood that although not shown, other hardware and/or software components could be used in conjunction with computer system/server 612. Examples, include, but are not limited to: microcode, device drivers, redundant processing units, external disk drive arrays, RAID systems, tape drives, and data archival storage systems.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer implemented method comprising:
    receiving, by a computer system, at least one image of a well plate having at least one well containing a liquid sample;
    executing, by the computer system, a set of logical operations cropping the image to include a well of interest of the at least one well of the well plate prior to further image analysis; and
    processing, by a convolutional neural network, the cropped image after isolating the well of interest by the cropping of the image, wherein:
    the convolutional neural network is trained to detect bubbles at the well of interest before light scattering measurements are performed on the liquid sample;
    the processing by the convolutional neural network results in a probability that the image depicts at least one bubble; and
    the processing includes assessing, based on a probability score, whether the liquid sample is suitable for the light scattering measurements.

2. The method of claim 1 wherein the convolutional neural network comprises a convolutional neural network trained by a stochastic gradient descent training session on a set of training images of the at least one well.

3. The method of claim 1 further comprising
    displaying, by the computer system, on a display of the computer system a presence of the at least one bubble.

4. The method of claim 3 wherein the displaying comprises displaying, by the computer system, on the display of the computer system the presence of the at least one bubble in the sample in a data grid format displaying data corresponding to the sample,
    wherein the data comprises a sample identifier corresponding to the sample, a data quality indicator to indicate a problem with the sample, and a bubble detection indicator to indicate the presence of the at least one bubble.

5. The method of claim 4 wherein the data further comprises the probability corresponding to the sample.

6. The method of claim 3 wherein the displaying comprises displaying, by the computer system, on the display of the computer system the presence of the at least one bubble in the sample in an image view format displaying the image.

7. The method of claim 6 wherein the displaying further comprises displaying, by the computer system, on the display of the computer system, the probability.

8. The method of claim 3 wherein the displaying comprises displaying, by the computer system, on the display of the computer system the presence of the at least one bubble in the sample in an autocorrelation format displaying an intensity autocorrelation graph and an error graph.

9. The method of claim 8 wherein the displaying further comprises displaying, by the computer system, on the display of the computer system, the probability.

10. A computer implemented method comprising:
    receiving, by a computer system, parameters for a stochastic gradient descent training session;
    receiving, by a computer system, a set of training images of a well plate having at least one well containing a liquid sample from a data store;
    executing, by the computer system, a set of logical operations cropping the set of training images to isolate a well of interest of the at least one well;
    processing, by the computer system, the set of training images with respect to the parameters to select random images among the cropped training images, resulting in at least one mini batch comprising mini-batch images;
    processing, by the computer system, the at least one mini-batch via a convolutional neural network comprising a set of weights and biases,
    calculating, by the computer system, a gradient of a loss function with respect to the set of weights and biases of the convolutional neural network evaluated for the set of mini-batch probability values;
    processing, by the computer system, the convolutional neural network with respect to the calculated gradient, resulting in an updated convolutional neural network with an updated set of weights and biases;
    processing, by the computer system, the at least one mini-batch with the updated convolutional neural network with respect to the parameters in an iterative fashion in an epoch corresponding to the mini-batch; and
    outputting, by the computer system, a trained convolutional neural network with respect to the training parameters and the set of training images, wherein
    the convolutional neural network is trained to detect bubbles at the well of interest before light scattering measurements are performed on the liquid sample;
    the processing by the convolutional neural network results in a probability that an image of the mini-batch images depicts at least one bubble; and
    the processing includes assessing, based on the probability score, whether the liquid sample is suitable for the light scattering measurements.

11. The method of claim 10 wherein the parameters comprise:
    a mini-batch size of each mini-batch indicating a number of images in the mini-batch; a number of epochs within which the convolutional neural network is trained on each mini-batch;
    an input image size; and
    a number of iterations in the epoch corresponding to a number of training images divided by the mini-batch size.

12. The method of claim 10 wherein the loss function comprises a cross-entropy loss function.

13. The method of claim 10 further comprising processing, by the computer system, a learning rate of the stochastic gradient descent training session via an Adam algorithm with respect to changes in the loss function among iterations of the stochastic gradient descent training sessions,
    wherein the learning rate is configured to control how fast the gradient is descended.

14. A system comprising:

a memory; and a processor in communication with the memory, the processor configured to perform a method comprising:

receiving at least one image of a well plate having at least one well containing a liquid sample;

executing a set of logical operations cropping the image to include a well of interest of the at least one well of the well plate prior to further image analysis; and processing, by a convolutional neural network, the cropped image after isolating the well of interest by the cropping of the image, wherein:

the convolutional neural network is trained to detect bubbles at the well of interest before light scattering measurements are performed on the liquid sample;

the processing by the convolutional neural network results in a probability that the image depicts at least one bubble; and the processing includes assessing, based on the probability score, whether the liquid sample is suitable for the light scattering measurements.

15. A computer program product comprising a non-transitory computer readable storage medium having program instructions embodied therewith, the program instructions executable by a processor to cause the processor to perform a method comprising:

receiving at least one image of at least one well of a well plate containing a liquid sample;

executing a set of logical operations cropping the image to include a well of interest; and executing a set of logical operations processing, by a convolutional neural network, the cropped image, wherein:

the convolutional neural network is trained to detect bubbles at the well of interest before light scattering measurements are performed on the liquid sample;

the processing by the convolutional neural network results in a probability that the image depicts at least one bubble; and the processing includes assessing, based on the probability score, whether the liquid sample is suitable for the light scattering measurements.

* * * * *